United States Patent [19]

Schmidt

[11] 4,314,435
[45] Feb. 9, 1982

[54] FOLIAGE TRIMMER

[75] Inventor: Alfred Schmidt, St. Blasien, Fed. Rep. of Germany

[73] Assignee: Alfred Schmidt GmbH, St. Blasien, Fed. Rep. of Germany

[21] Appl. No.: 154,118

[22] Filed: May 28, 1980

[30] Foreign Application Priority Data

Nov. 24, 1979 [DE] Fed. Rep. of Germany ....... 2947511

[51] Int. Cl.³ .................... A01D 55/02; A01D 55/22; A01D 57/00
[52] U.S. Cl. .................................. 56/13.3; 56/13.8; 56/234; 56/320.2; 241/101.2
[58] Field of Search .................. 56/13.7, 13.8, 12.7, 56/233, 234, 238, 13.1, 13.2, 13.3, 13.4, 504, 501

[56] References Cited

U.S. PATENT DOCUMENTS

| 1,913,094 | 6/1933 | Smith et al. | 56/238 |
| 4,196,567 | 4/1980 | Davis et al. | 56/13.7 |

FOREIGN PATENT DOCUMENTS

| 2364657 | 6/1975 | Fed. Rep. of Germany | 56/13.7 |
| 674569 | 6/1952 | United Kingdom | 56/13.3 |
| 928230 | 6/1963 | United Kingdom | 56/234 |
| 209886 | 1/1968 | U.S.S.R. | 56/13.3 |

Primary Examiner—Jay N. Eskovitz

[57] ABSTRACT

A foliage trimmer having a housing connected to a source of suction, a fly cutter rotatably mounted therein, and a bar cutter mounted along the lower leading edge of the housing. The fly cutter and the bar cutter are driven simultaneously by drive means mounted on the housing.

8 Claims, 3 Drawing Figures

FOLIAGE TRIMMER

BACKGROUND OF THE INVENTION

The present invention relates to apparatus for trimming foliage, such as grass, hedges, bushes and the like.

In German Patent Application No. 2,159,944, a "fly cutter" for trimming grass, hedges, road shoulders, slopes and the like is shown. The "fly cutter" comprises a horizontal rotatable shaft on which is affixed a plurality of chains, on each of which is secured one or more cutting elements. The shaft is journalled at its ends in a housing which is open at its bottom, so that as the shaft rotates, the cutting elements engage and cut the grass simultaneously, flinging the cuttings into the housing. The housing is connected by a suitable duct to a source of vacuum, so that the cuttings are then sucked into a suitable receptacle. Such apparatus, however, is unsuitable for the cutting of hedges, shrubs and the like since the cutting elements, secured at the end of relatively flexible chains, provide a clean cut only because the grass is held firmly by the ground. Since hedges, shrubs and the like have rather long stems and branches, there is no firm counter-support for a clean trimming operation.

It has been further known from German Patent Application No. 2,707,480 to combine a "fly-cutter" (having a conical rotating cylinder) with an edge type cutting unit in the form of a sickel mower having a vertical axis. The fly-cutting unit is adapted to mow a road bed edge along the sides of the guide rail of the road, while the sickle type mower is adapted to mow the grass between the posts of the guide rail. The sickle type mower throws the grass clippings into the path of the fly-cutting unit so that the cuttings can be sucked by the vacuum source. In this form of the apparatus, the two mower units perform different functions independently of each other and only the collection of the cuttings is affected through the same suction system. In any event, this apparatus is incapable of trimming hedges, shrubs and the like.

Hedge and shrub trimmers are, of course, also known. These devices, however, suffer from the defect that the cut material is left free to fall to the ground.

The present invention overcomes the defects of the prior known devices and provides a simple apparatus which is capable of mowing and trimming grass as well as hedges, shrubs and the like while simultaneously providing for their immediate removal through the suction system.

SUMMARY OF THE INVENTION

According to the present invention, the problems found in the prior art are overcome by providing the housing, having an open bottom, in which a fly-cutting unit is rotatably mounted and to which a source of suction is connected. A pair of oscillating and cooperating bar type cutters, are mounted in the opening of the housing, so that the cutting edges extend parallel to the axis of rotation of the fly-cutter and as close to the plane of the opening of the housing. The bar cutter unit is operated by suitable power means such as a hydraulic motor, simultaneously with the fly-cutting unit, when a hedge is to be trimmed.

In such an apparatus, branches cut off by the bar cutters are immediately seized by the elements of the fly-cutting unit and are shred to relatively small pieces and hurled directly into the suction system for immediate removal. The cutter bar unit produces a clean cut, since the elements cooperate with each other forming counter cutting surfaces. The fly-cutter unit functions to further shred and transport this cut material in a simple and easy manner into the discharge opening. The transport of the material is accomplished even if the suction system is disconnected since the centrifugal forces created by the rotating fly-cutter unit are sufficient to throw the shredded material out of the opening of the housing. A particularly great cutting height can be obtained by the apparatus due to the fact that the bar cutter unit forms the lower edge of the apparatus.

To improve the reception of relatively large pieces of wood in the housing, it may be advantageous to provide the housing with a closing bottom plate below the fly-cutter unit. An especially good cutting effect is achieved when the bar cutting unit is arranged in front of the bottom plate. In order to obtain the greatest acceleration for the transport of cut branches, the cutter bar unit may be arranged at a small distance below the closing bottom plate. In this manner, the action of the bar cutter unit automatically acts to remove the branches into the housing.

Full details of the present invention are set forth in the following disclosure, and are shown in the accompanying drawings.

DESCRIPTION OF THE INVENTION

Figure 1:
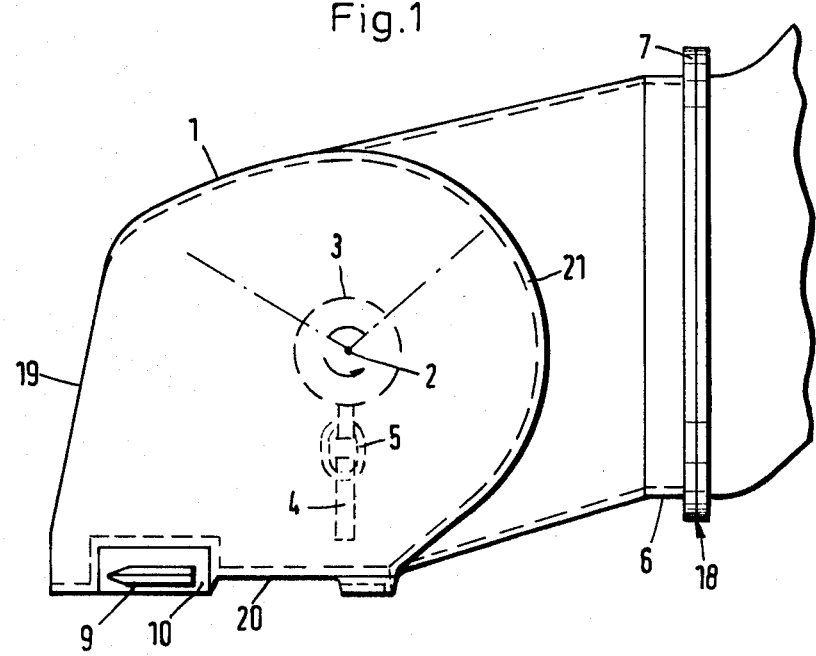
FIG. 1 is a side elevational view of the apparatus of the present invention.

As seen in the drawings, the apparatus comprises a mowing head consisting of an oblong housing 1 having a generally domed roof, a pair of side walls and a generally circular rear wall 21, having a central discharge opening. Mounted along a horizontal axis 2 is a rotary shaft 3 on the periphery of which fly-cutter elements 4 are secured on each of a plurality of chain members 5. Chain members 5 are secured to the rotary shaft in rows extending along the length of the shaft, which rows are preferably distributed in three uniformly spaced rows, 120° from each other. A closure bottom plate 20 is provided, extending in the forward direction from the rear wall 21. The rear housing wall 21 is circular, and generally conforms to the figure of a rotation made by the rotating cutting elements 4. The shaft 3 and the rear wall 21 are positioned relative to each other so that the surface of the rear wall 21 lies close to the outer peripheral edge of the cutting element 4. The rear wall of the housing is connected to the end of a flexible hose 8, which is adapted to be connected to a suction system. The connecton is formed by a rotatable coupling, so that the housing and hose are swivable with respect to each other. To this end, the rear wall tapers towards the longitudinal center of the housing, in the rearward direction, to form a funnel portion 6 having annular flange 7, the central axis of which lies perpendicular to the axis 2 of the rotating shaft and also in the generally horizontal plane of the bottom plate 20. The flexible hose 8 ends in a similar coupling member 18, cooperating matingly with flange 7.

The fly-cutter shaft 3 is journalled in suitable end bearings 12 provided with suitable means for rotating same in a counter-clockwise direction as seen by the arrow in FIG. 1. The construction of the fly-cutter unit itself may be made in accordance with any of the known techniques and it is believed that further elaboration at this point is not necessary.

Mounted along the bottom edge of the housing, adjacent its front edge, is a bar cutter unit comprising a pair of bar cutter elements 9 mounted in a pair of slide bearings 10, which are themselves affixed to the side walls of the housing. The cutter bars are preferably disposed parallel to the bottom plate 20, and slightly below the plane thereof. The cutter bars 9 are oscillated with respect to each other, as indicated by the double arrows in FIG. 2.

The fly-cutter shaft 3, and the bar cutter 9, are driven through a drive transmission 11, disposed in a casing, affixed to the exterior surface of the side wall. The drive transmission is powered by a hydraulic motor 13, fed by a suitable source of hydraulic fluid, located in the cab or other part of the vehicle and regulated by control means, not shown in the drawings. The source of hydraulic fluid, and the control means for the same, follow well-known techniques known to those skilled in the art. Of course, an electric motor may be used, the transmission may be a chain and pulley or ratchet type mechanism.

Figure 2:
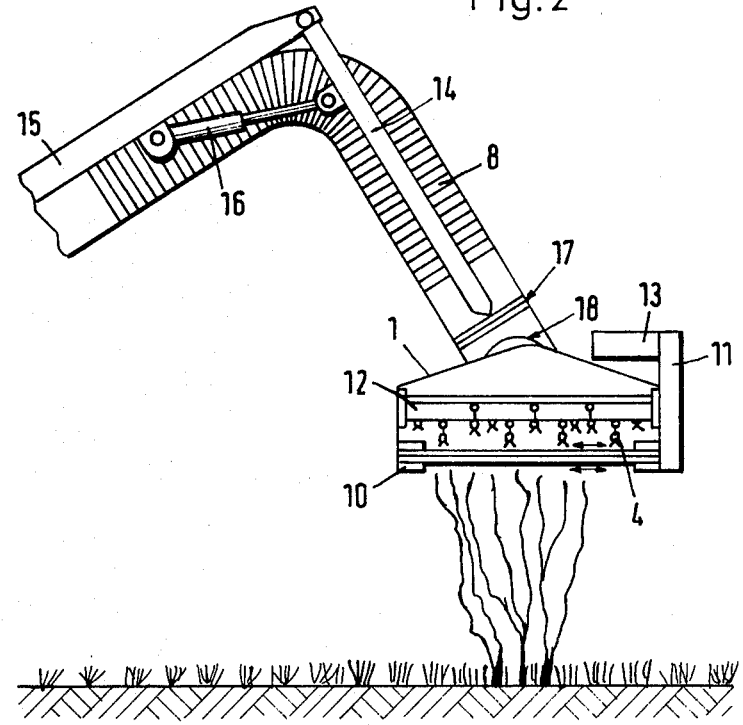
FIG. 2 is a front elevational view of the apparatus of the present invention showing the connecting tube to the vacuum source and the means for supporting the apparatus in addition thereto.

As will be seen further in FIG. 2, a flexible suction hose 8 is provided with a second rotatable coupling 17, having the central axis perpendicular to that of the first coupling 18. The suction hose is supported by a jib mechanism, formed by link rods 14 and 15, pivotably hinged together and connected by means of a hydraulic piston 16. The innerlink 15 may be directly connected to a supporting vehicle, or to other supporting link mechanism. By this manner, the apparatus with the present mechanism may be extended in a cantilever manner, from the moving vehicle or support. By operation of the hydraulic piston 16, the apparatus may be extended at any height, and distance from the vehicle, and by rotation of the elements relative to the couplings 17 and 18, the slope and/or attitude of the cutters may be selectively adjusted so that the apparatus can be brought to any desired cutting height and slanted and-/or vertical operation made possible.

The apparatus may be attached to a road vehicle, rail vehicle, or similar machine which houses the source of hydraulic fluid, and the controls for the motor 13, as well as the piston 16, and which provides similar connection and hydraulic means of operating the rod links 14 and 15. The vehicle may be provided with a collecting bin or receptacle, a source of suction, and the usual vacuum control means, for collecting the grass and branch cutting.

The cutting bar elements 9 and/or is slidable bearing 10, may be detachably connected to each other and the housing, so that they may be removed for operation of the fly-cutter, alone, or for replacement.

Figure 3:
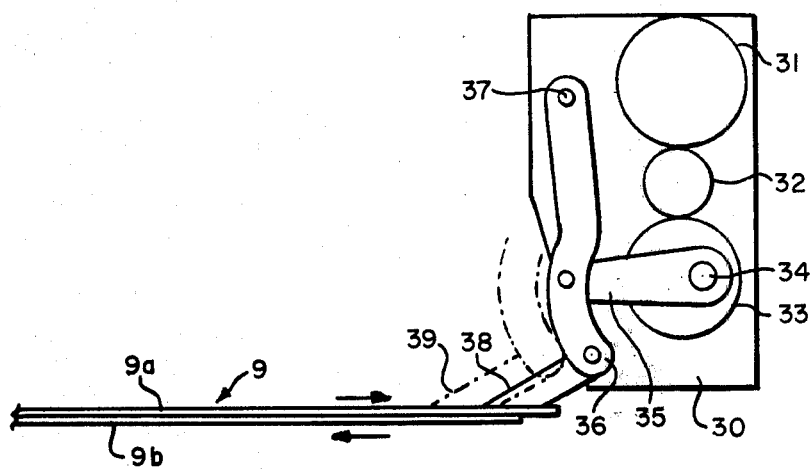
FIG. 3 is an enlarged view of the motor means and transmission for oscillating the cutter bars.

FIG. 3 illustrates by way of an example some means for driving the fly-cutter shaft 3 and the bar cutters 9. The drive transmission 11, as shown in FIG. 2, which is powered by a rotary hydraulic motor 13, comprises a first gear wheel 31 connected to the shaft of the hydraulic motor 13, a second gear wheel 32 rotably connected to fly-cutter shaft 3 and a third gear wheel 33 supported within a bearing plate 30. To an eccentric bolt 34 extending laterally from third gear wheel 33 an eccentric lever 35 is linked which by itself is linked to a swivel arm 36 pivoting around plug 37 being itself affixed to said bearing plate 30. The lower end of swivel arm 36 is linked to a journal bearing 38 of upper cutter bar 9a. The lower cutter bar 9b is driven in counter direction with respect to the upper cutter bar 9a by an equivalent gear wheel drive (not shown in the drawing) coupled to the lower cutter bar 9b by its journal bearing 39, both cutter bars 9 oscillating with respect to each other.

Various modifications and changes are suggested above; others will be apparent to those skilled in the present art. The present application is intended, therefore, as being illustrative and not limiting of the invention.

What is claimed is:

1. Apparatus for trimming foliage comprising a housing having an opening along its bottom and mounted at the end of a hose connected to a source of suction, a fly-cutter rotatably mounted within said housing and a bar cutter mounted within said opening, and forming the lower front edge of said housing said bar cutter extending parallel to the axis of rotation of said fly-cutter and adjacent to the plane of the bottom of said housing, and a plate mounted to the bottom of said housing to the rear of said bar cutter to enclose said housing and cause the material cut by said bar cutter to be engaged by said fly-cutter and thereby subsequently cut into small pieces.

2. The apparatus according to claim 1, wherein said bar cutter is located below the plane of said bottom plate.

3. The apparatus according to claims 1, or 2, wherein said bar cutter is parallel to the plane of said bottom plane.

4. The apparatus according to claim 1, including means mounted on said housing for driving said fly-cutter and said bar cutter.

5. The apparatus according to claim 4, wherein said drive means including transmission means for driving said fly-cutter and bar cutter simultaneously.

6. The apparatus according to claim 1, wherein said bar cutter is mounted immediately forward of the locus of the fly-cutter.

7. The apparatus according to claim 1, wherein said hose is coupled to said housing for rotary movement with respect thereto.

8. The apparatus according to claim 7, including articulating linkage for supporting said hose, said linkage being adjustable in length and direction.

* * * * *